(12) United States Patent
Lu

(10) Patent No.: US 10,774,806 B1
(45) Date of Patent: Sep. 15, 2020

(54) HYDROPOWER SYSTEM

(71) Applicant: Shun Tsung Lu, Taichung (TW)

(72) Inventor: Shun Tsung Lu, Taichung (TW)

( * ) Notice: Subject to any disclaimer, the term of this patent is extended or adjusted under 35 U.S.C. 154(b) by 0 days.

(21) Appl. No.: 16/371,111

(22) Filed: Apr. 1, 2019

(51) Int. Cl.
*F03B 13/00* (2006.01)
*H02P 9/04* (2006.01)
*F03B 17/06* (2006.01)

(52) U.S. Cl.
CPC ........ *F03B 17/065* (2013.01); *F05B 2220/32* (2013.01); *F05B 2240/241* (2013.01)

(58) Field of Classification Search
CPC ....... F03B 17/06; F03B 17/062; F03B 17/065
See application file for complete search history.

(56) References Cited

U.S. PATENT DOCUMENTS

| | | | | | |
|---|---|---|---|---|---|
| 376,357 | A * | 1/1888 | Weeks | ......... | F03D 3/0445 415/146 |
| 1,083,472 | A * | 1/1914 | Watson | ......... | 416/119 |
| 1,441,863 | A * | 1/1923 | Luick | ......... | F03B 17/065 415/141 |
| 4,383,797 | A * | 5/1983 | Lee | ......... | F03B 17/062 405/22 |
| 5,051,059 | A * | 9/1991 | Rademacher | ......... | F03B 17/062 415/3.1 |
| 8,120,196 | B1 * | 2/2012 | Neese | ......... | F03B 13/183 290/53 |
| 8,419,367 | B2 * | 4/2013 | Fite | ......... | F03B 17/065 416/119 |
| 9,587,621 | B2 * | 3/2017 | Kumano | ......... | F03B 17/065 |
| 2004/0101397 | A1 * | 5/2004 | Godsall | ......... | F03B 7/00 415/3.1 |
| 2007/0020097 | A1 * | 1/2007 | Ursua | ......... | F03B 13/264 415/213.1 |
| 2007/0110556 | A1 * | 5/2007 | Henkenhaf | ......... | F03D 3/02 415/3.1 |
| 2007/0182159 | A1 * | 8/2007 | Davis | ......... | F03B 11/004 290/54 |
| 2008/0231057 | A1 * | 9/2008 | Zeuner | ......... | F03B 17/065 290/54 |
| 2009/0309368 | A1 * | 12/2009 | Kumano | ......... | F03B 7/00 290/54 |
| 2010/0096856 | A1 * | 4/2010 | Janca | ......... | F03B 13/10 290/52 |

(Continued)

FOREIGN PATENT DOCUMENTS

| | | | | | |
|---|---|---|---|---|---|
| FR | 2525694 | A1 * | 10/1983 | ............ | F03B 17/065 |
| GB | 176933 | A * | 3/1922 | ............ | F03B 17/062 |

*Primary Examiner* — Tulsidas C Patel
*Assistant Examiner* — Thomas K Quigley
(74) *Attorney, Agent, or Firm* — Alan D. Kamrath; Karin L. Williams; Mayer & Williams PC

(57) ABSTRACT

A hydropower system has a channel and at least one water turbine. The channel has a flowing path, two side walls, and at least one turbine recess recessed in at least one of the side walls and having an opening communicating with the flowing path. The at least one water turbine is mounted in the at least one turbine recess and has a shaft, a blade wheel, and a generator. The blade wheel is mounted on and rotatable with the shaft and partially protrudes into the flowing path. The generator is connected to the shaft. The blade wheel may be propelled to rotate by flowing water flowing through the flowing path to drive the generator to generate power.

6 Claims, 6 Drawing Sheets

(56) References Cited

U.S. PATENT DOCUMENTS

| | | | |
|---|---|---|---|
| 2010/0301609 A1* | 12/2010 | Kim | F03B 17/065 290/54 |
| 2012/0262036 A1* | 10/2012 | Drews | F03B 7/00 310/75 R |
| 2013/0115084 A1* | 5/2013 | Capan | F03B 17/065 416/9 |
| 2014/0217738 A1* | 8/2014 | Lipman | F03B 13/264 290/54 |
| 2018/0023533 A1* | 1/2018 | Oh | F03B 7/00 310/40 R |
| 2018/0195582 A1* | 7/2018 | Han | F16H 3/724 |

* cited by examiner

HYDROPOWER SYSTEM

BACKGROUND OF THE INVENTION

1. Field of the Invention

The present invention relates to a generation system, and more particularly to a hydropower system generating power by flowing water.

2. Description of Related Art

With reference to FIG. 6, a conventional run-of-river hydropower system includes a canal 72 diverted from a flowing river 71 and a water turbine 73 placed in the canal 72.

The flowing water diverted into the canal 72 from the flowing river 71 spins the water turbine 73 and drives a generator for generating electric power.

To improve power-generating efficiency, the water turbine 73 is placed in a segment of the canal 72 which is away from a headrace of the canal 72 with a large height difference. However, the conventional run-of-river hydropower system requires a canal 72 to be built alongside the flowing river 71. The construction is time-consuming and labor-intensive. Moreover, one canal 72 is only suitable for setting one water turbine 73, and power generation of the water turbine 73 is limited.

To overcome the shortcomings, the present invention tends to provide a hydropower system to mitigate or obviate the aforementioned problems.

SUMMARY OF THE INVENTION

The main objective of the invention is to provide a hydropower system which can generate power by flowing water flowing through an existing river directly. Thus, the construction of the hydropower system is easy and may reduce time and labor.

The hydropower system has a channel and at least one water turbine. The channel has two side walls, a flowing path, and at least one turbine recess. The at least one turbine recess is recessed in at least one of the side walls. Each turbine recess has a spinning space formed therein and an opening communicating with the flowing path. An amount of the at least one water turbine is equal to an amount of the at least one recess. Each water turbine is mounted in the spinning space of the corresponding turbine recess, and has a shaft, a blade wheel, and a generator. The shaft is vertically and axially rotatably mounted in the spinning space of the corresponding turbine recess. The blade wheel is mounted on and rotatable with the shaft, partially protrudes into the flowing path from the opening of the corresponding turbine recess, and has a base fixed on the shaft and multiple driving blades mounted around the base at equiangular intervals and extending radially. The generator is connected with the shaft.

Other objects, advantages and novel features of the invention will become more apparent from the following detailed description when taken in conjunction with the accompanying drawings.

DETAILED DESCRIPTION OF PREFERRED EMBODIMENT

Figure 1:
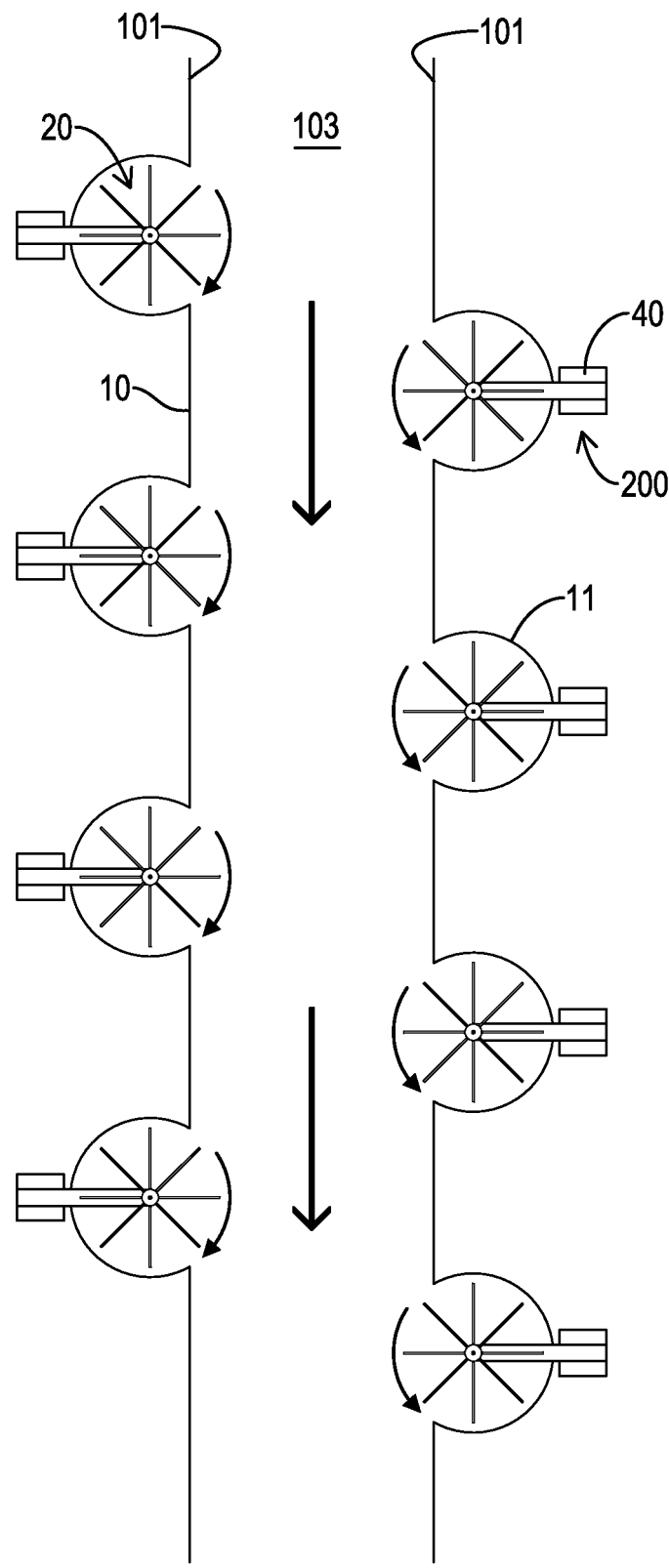
FIG. 1 is a top view of a first embodiment of a hydropower system in accordance with the present invention.
Figure 2:
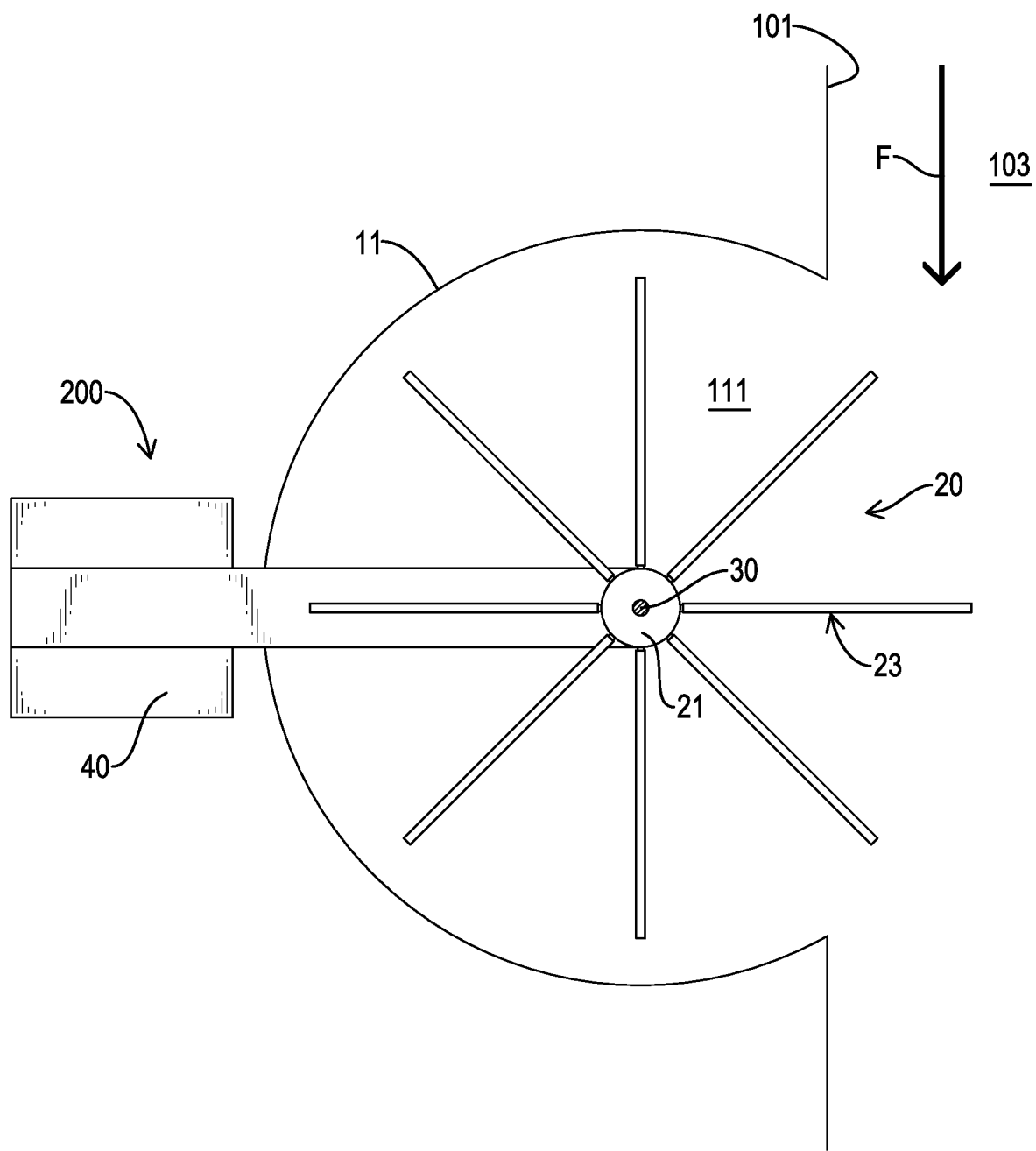
FIG. 2 is an enlarged top view of the hydropower system, in FIG. 1.

With reference to FIGS. 1 and 2, a hydropower system in accordance with the present invention has a channel 10 and at least one water turbine 200.

The channel 10 is applied for flowing water F to flow through, and has two side walls 101, a flowing path 103, and at least one turbine recess 11. The two side walls 101 and the flowing path 103 may be formed from a flowing river directly. The at least one turbine recess 11 is recessed in at least one of the side walls 101 of the channel 10. The at least one turbine recess 11 may be multiple turbine recesses 11. The multiple turbine recesses 11 may be recessed in one of the side walls 101 and arranged along the side wall 101 at spaced intervals, or recessed in the two side walls 101 and each of the side walls 101 has at least one of the turbine recesses 11 formed therein. The turbine recesses 11 formed in the different side walls 101 may be arranged in opposite positions or in staggered positions. Each turbine recess 11 has a spinning space 111 and an opening communicating with the flowing path 103.

The amount of the at least one water turbine 200 is equal to the amount of the at least one turbine recess 11. Multiple said water turbines 200 are respectively mounted in the spinning spaces 111 of the multiple turbine recesses 11. Each water turbine 200 has a shaft 30, a blade wheel 20, and a generator 40. The shaft 30 is vertically and axially rotatably mounted in the spinning space 111 of the turbine recess 11. The blade wheel 20 is disposed under the flowing water F, is fixed on and rotatable with the shaft 30, partially protrudes into the flowing path 103 from the opening of the turbine recess 11, and has a base 21 and multiple driving blades 23. The base 21 is fixed on the shaft 30. The driving blades 23 are mounted around the base 21 at equiangular intervals and extend radially. The generator 40 is connected with the shaft 30. The blade wheel 20 will be propelled to rotate by the flowing water. F flowing through the flowing path 103, and the shaft 30 will be spinning with the blade wheel 20 to drive the generator 40 for generating electric power.

In the first embodiment of the water turbine 200, each driving blade 23 is a flat blade, and a portion of the driving blade 23 that is away from the base 21 protrudes into the flowing path 103 from the opening of the turbine recess 11.

Figure 3:
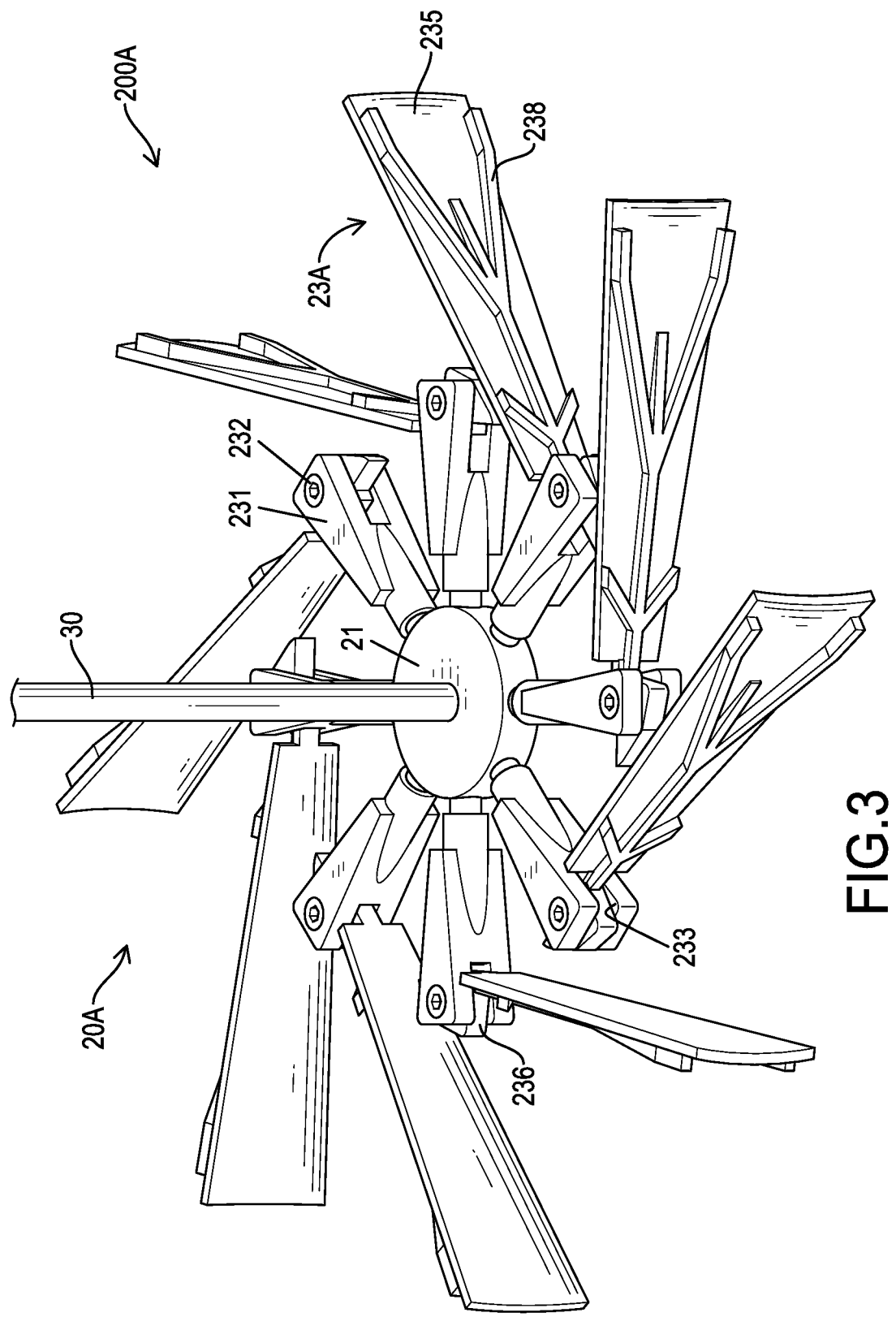
FIG. 3 is a perspective view of a second embodiment of a water turbine of a hydropower system in accordance with the present invention.

With reference to FIG. 3, in a second embodiment of the water turbine 200A, each driving blade 23A has a fixed arm 231 and a swing blade 235. The fixed arm 231 is fixed on the base 21, extends outward from the base 21, and has a limiting slot 233 formed in an end of the fixed arm 231 that is away from the base 21. The swing blade 235 is pivotally connected to the end of the fixed arm 231 away from the base 21 in a unidirectional deflection with a pivot 232. The swing blade 235 has a limiting block 236 formed in an end of the swing blade 235 near the fixed arm 231. The limiting block 236 may abut against an inner surface of the limited slot 233 to limit a rotatable area and deflection direction of the swing blade 235. The deflection direction of the swing blade 235 is reversed to the rotation direction of the shaft 30. An end of the swing blade 235 away from the fixed arm 231 protrudes from the opening of the turbine recess 11 into the flowing path 103, and is propelled to rotate by the flowing water F. Preferably, a length of the swing blade 235 protruding into the flowing path 103 while the swing blade 235 is directly facing the flowing path 103 is 40 centimeters. Therefore, the swing blade 235 can be propelled by the flowing water F easily and has less influence on the flow rate of the flowing water F to improve generating efficiency.

Preferably, the swing blade 235 is a flat blade and has multiple ribs 238 formed on a side of the swing blade 235 to increase the structural strength of the swing blade 235.

Figure 4:
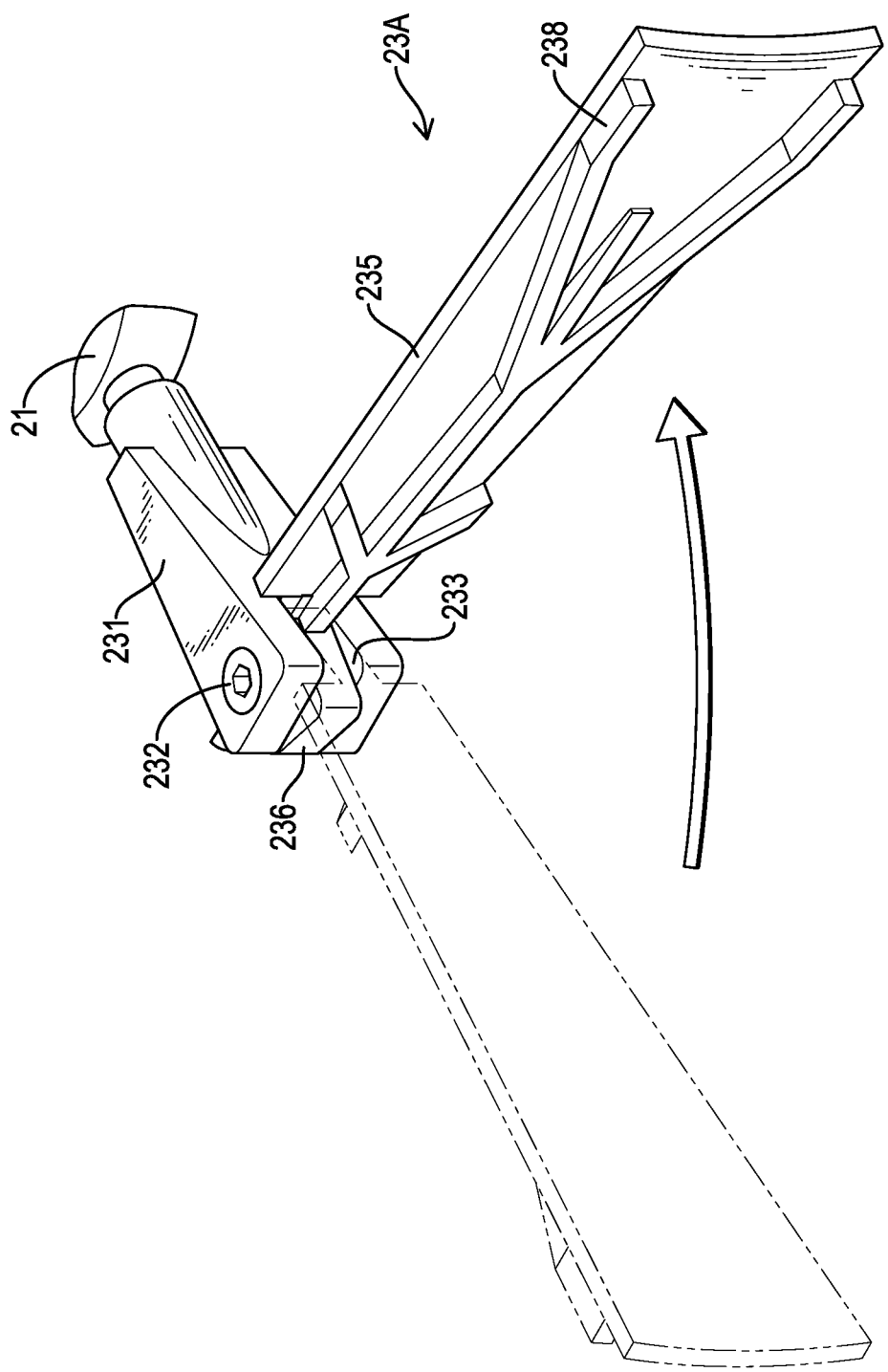
FIG. 4 is an enlarged operational perspective view of the water turbine of the hydropower system in FIG. 3.
Figure 5:
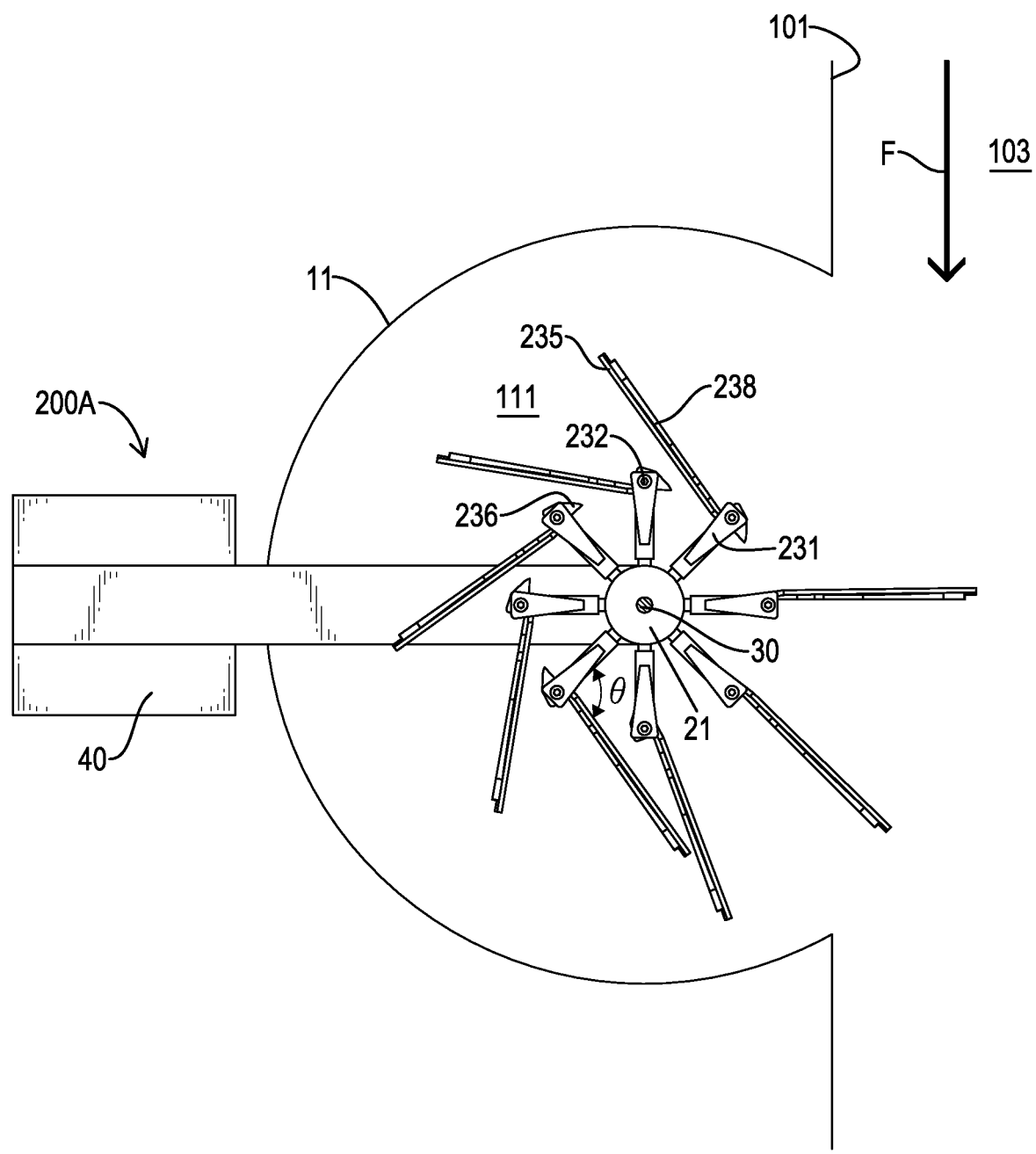
FIG. 5 is an enlarged operational top view of the hydropower system with the second embodiment of the water turbine in FIG. 3.
Figure 6:
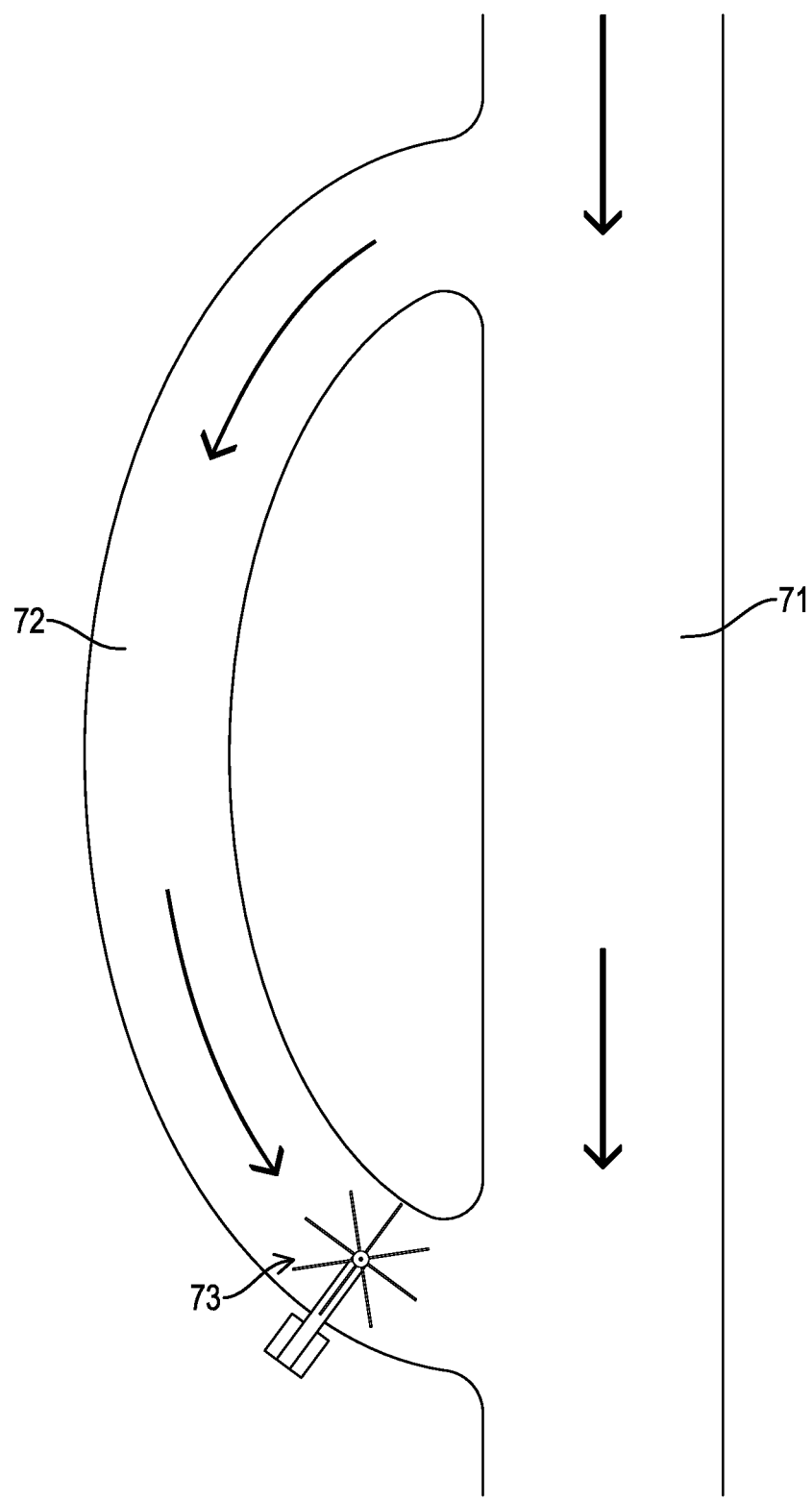
FIG. 6 is a top view of a conventional run-of-river hydropower system.

With reference to FIGS. 4 and 5, when the swing blades 235 protrude into the flowing path 103 and are being propelled by the flowing water F, the limiting block 236 will be pivoted to abut against the inner surface of the limiting slot 233, and the swing blades 235 will be pivoted to be parallel to the fixed arms 231 to increase a moment arm of the driving blade 23A. When the swing blades 235 are rotating into the turbine recesses 11, the swing blades 235 will be pulled by water drag force and will be pivoted backward from the rotating direction of the blade wheel 20A. The angle θ between the swing blade 235 and the fixed arm 231 will be less than 180 degrees. Thus, the length of the moment arm of the driving blade 23A will be decreased. The influences of water drag force on the blade wheel 20A will be reduced. The torque of the blade wheel 20A caused by the flowing water F will be greater than the torque of the blade wheel 20A caused by the water drag force, and the blade wheel 20A will be propelled to rotate by the flowing water F more easily and unimpededly.

With such arrangements, the water turbines 200, 200A, 200B can be propelled to generate power by flowing water F flowing through an existing river directly, and the multiple water turbines 200, 200A, 200B can be set alongside of the existing river to increase the power generation. The construction of the hydropower system in accordance, with the present invention is easy and may reduce time and labor.

What is claimed is:

1. A hydropower system comprising:
    a channel having
        two side walls;
        a flowing path formed between the two side walls; and
        at least one turbine recess recessed in at least one of the side walls of the channel, and each one of the at least one turbine recess having a spinning space formed in the turbine recess and an opening communicating with the flowing path;
    at least one water turbine, an amount of the at least one water turbine being equal to an amount of the at least one turbine recess, and each one of the at least one water turbine mounted in the spinning space of a corresponding one of the at least one turbine recess, and having
        a shaft vertically and axially rotatably mounted in the spinning space of the corresponding one of the at least one turbine recess;
        a blade wheel mounted on and rotated with the shaft, partially protruding into the flowing path of the channel from the opening of the corresponding one of the at least one turbine recess, and having
            a base fixed on the shaft; and
            multiple driving blades mounted around the base at equiangular intervals and extending radially; and
    a generator connected with the shaft; wherein
    each driving blade of the blade wheel of each one of the at least one water turbine has
        a fixed arm fixed on the base and extending outward from the base; and
        a swing blade pivotally connected with the fixed arm in a unidirectional deflection;
    wherein the fixed arm of each driving blade of the blade wheel of each one of the at least one water turbine has a limiting slot formed in an end of the fixed arm of the driving blade away from the base of the blade wheel; and
    the swing blade of each driving blade of the blade wheel of each one of the at least one water turbine has a limiting block formed in an end of the swing blade of the driving blade near the fixed arm of the driving blade and being pivotable to abut against an inner surface of the limiting slot of the fixed arm of the driving blade of the blade wheel of the water turbine,
    wherein the swing blade of each driving blade of the blade wheel of each one of the at least one water turbine has ribs formed on a surface of the swing blade.

2. The hydropower system as claimed in claim 1, wherein a length of a portion of the swing blade protruding into the flowing path while the swing blade is directly facing the flowing path is 40 centimeters.

3. The hydropower system as claimed in claim 1, wherein each one of the at least one water turbine has two said blade wheels mounted on the shaft of the water turbine and arranged along the shaft at a spaced interval.

4. The hydropower system as claimed in claim 2, wherein each one of the at least one water turbine has two said blade wheels mounted on the shaft of the water turbine and arranged along the shaft at a spaced interval.

5. The hydropower system as claimed in claim 1, wherein each of the side walls of the flowing channel has multiple said turbine recesses recessed in the side wall, and the turbine recesses recessed in the two side walls are in a staggered arrangement.

6. The hydropower system as claimed in claim 2, wherein each of the side walls of the flowing channel has multiple said turbine recesses recessed in the side wall, and the turbine recesses recessed in the two side walls are in a staggered arrangement.

* * * * *